Jan. 13, 1959     F. H. MAGNUS     2,867,934
FISH LURE
Filed Nov. 1, 1955     2 Sheets-Sheet 2
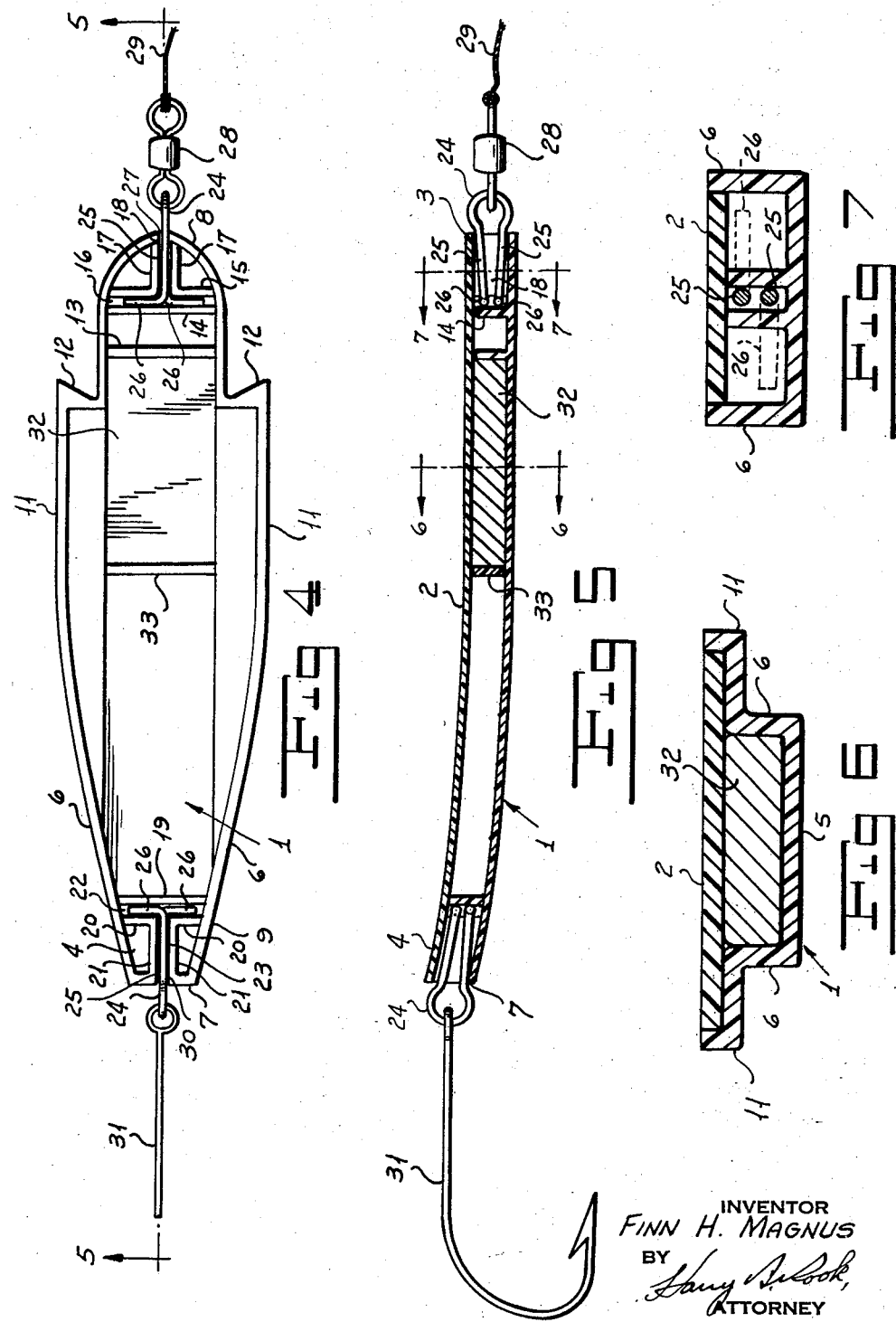
INVENTOR
FINN H. MAGNUS
BY
ATTORNEY

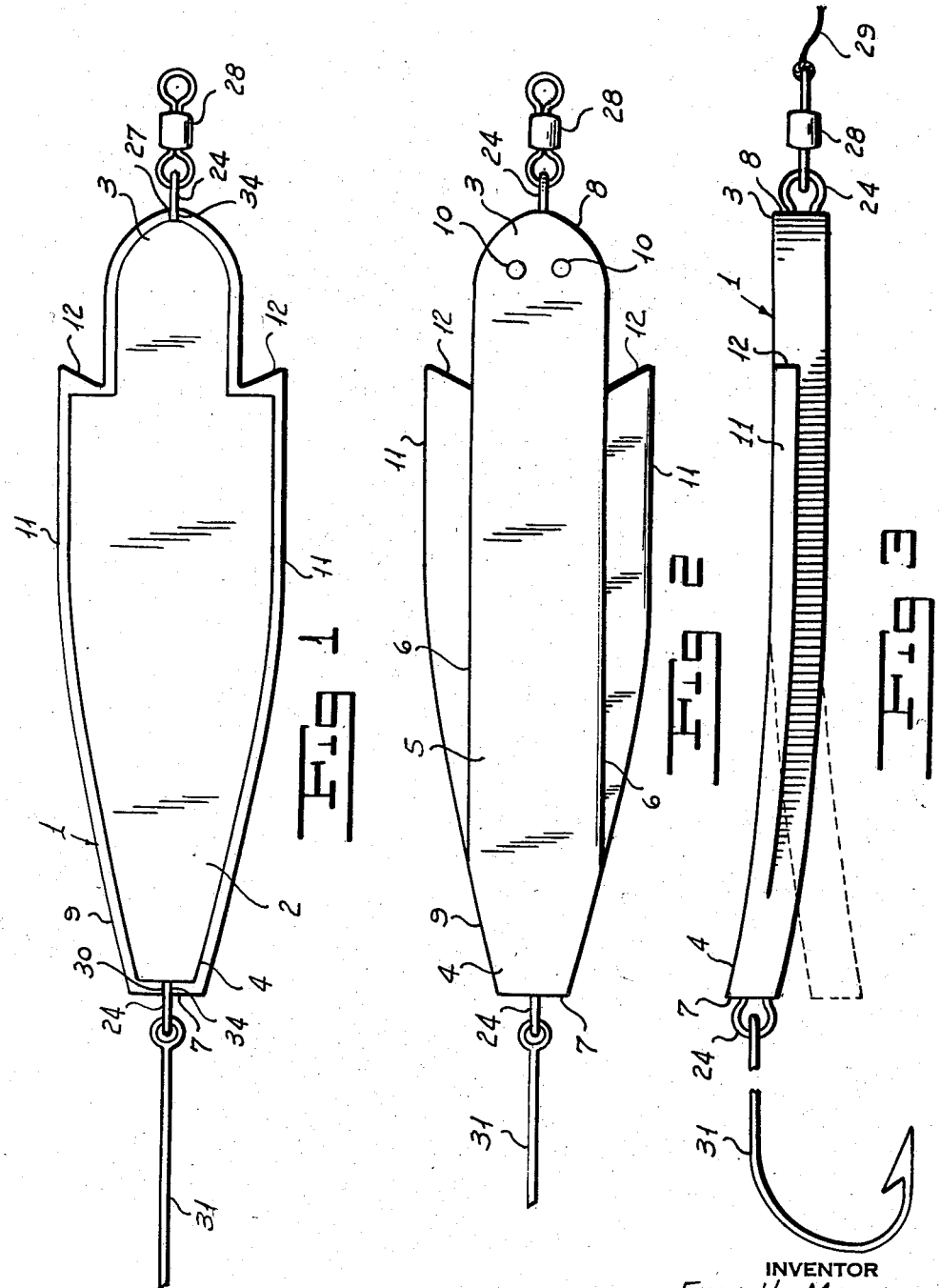

United States Patent Office 2,867,934
Patented Jan. 13, 1959.

2,867,934

FISH LURE

Finn H. Magnus, Essex Fells, N. J.

Application November 1, 1955, Serial No. 544,205

4 Claims. (Cl. 43—42.35)

This invention relates to new and useful improvements in a fish lure and more particularly to a so-called spoon bait.

A prime object of the present invention is to provide a fish lure body of substantially flat construction with a slight bend at one end thereof in simulation of a spoon configuration.

Another object of the invention is to provide a fish lure embodying novel features of construction so that the lure flutters or moves irregularly and darts when drawn through the water in simulation of a wounded bait fish.

A further object of the invention is to provide a fish lure so constructed with wings or fins and shoulders that when the lure is pulled through the water the shoulders tend to continuously deflect the lure off course with a side to side motion.

Other objects of the invention are to provide a novel connection between the hook and lure body and a novel connection between the fishing line and the lure body.

It is further proposed to produce a fish lure that is simple in construction, pleasing in appearance and that can be manufactured and sold at a reasonable cost.

For a further comprehension of the invention and of the objects and advantages thereof, reference will be made to the accompanying drawings forming a material part of this disclosure and wherein Figure 1 is a bottom plan view of a fish lure embodying the present invention.

Figure 2 is a top plan view thereof.

Figure 3 is a side elevational view thereof, the turned-over position of the lure being shown in dash lines.

Figure 4 is a view similar to Figure 1 but with the bottom closure plate removed.

Figure 5 is a sectional view taken on the plane of the line 5—5 of Figure 4.

Figure 6 is an enlarged cross-sectional view taken on the plane of the line 6—6 of Figure 5.

Figure 7 is an enlarged cross-sectional view taken on the plane of the line 7—7 of Figure 5.

Referring to the drawings in detail, the fish lure illustrated and made in accordance with the present invention is shaped to simulate substantially the appearance of a small bait fish, and at the same time to simulate the appearance of a spoon. The lure comprises a two-part body formed of a suitable resinous material and includes a substantially flat hollow body portion 1 and a closure plate 2. The body portion 1 is elongated and of channel-shape in configuration and cross-section and at one end is closed and formed round to serve as a head 3 in simulation of the head of a small bait fish. The opposite or tail end 4 is cut straight across and reduced in width and bent downwardly from the plane of the remainder of the body portion giving the lure the appearance of a spoon. The channel-shaped body portion includes a top wall 5, side walls 6, 6, rear wall 7 and front wall 8. At their rear ends, the side walls 6, 6 taper inwardly and rearwardly as indicated at 9. A pair of small circular depressions 10, 10 are formed in the top surface of the top wall 5 at the head end of the body portion in simulation of the eyes of a fish. A pair of wings or fins 11, 11 extend laterally of the side walls 6, 6 of the body portion tapering inwardly and rearwardly and merging gracefully at their rear ends with the tapered portions 9 of the side walls. At their front ends, the wings or fins 11, 11 are formed with shoulders 12, 12 slanting inwardly and rearwardly, and the wings are substantially thinner than the body.

Inside the head 3 of the body portion 1, adjacent the front ends of the wings or fins 11, 11, there is a cross piece 13 extending between the side walls 6, 6 for stiffening the body portion at this point. Outwardly of the cross piece 13 there is another similar stiffening cross piece 14. Between the cross-piece 14 and the front wall 8 of the body portion 1, there is a pair of L-shaped members disposed back to back in closely spaced relationship with their legs 15, 15 disposed in alignment and closely spaced from the cross piece 14 providing a transverse slot 16 therebetween. The other legs 17, 17 of the L-shaped members are disposed in parallel and closely spaced relationship forming an axially disposed slot 18 intersecting the transverse slot 16.

At the tail end 4 of the body portion 1, a cross piece 19 similar to cross piece 14 extends across the space between the side walls 6, 6 at the rear, and L-shaped members similar to the L-shaped members at the head 3 with their legs 20, 20 and 21, 21 similarly arranged and spaced to form a transverse slot 22 and an intersecting axially disposed slot 23 thereat.

Attaching devices for flexibly attaching fish lure accessories are removably mounted in the head and tail ends of the body portion 1. The attaching devices are of similar construction and each is formed from a length of round wire of heavy gauge bent upon itself to form an enlarged head or loop 24 at one end and a pair of juxtaposed closely spaced legs 25, 25 with their ends bent at right angles to the plane of the legs to form prongs 26, 26 extending in opposite directions. The attaching devices are mounted with the juxtaposed legs 25, 25 fitted in the axial slots 18 and 23 and with the prongs 26, 26 fitted in the transverse slots 16 and 22 behind the legs 15, 15 and 20, 20 of the L-shaped members. The juxtaposed legs 25, 25 of the attaching device at the head end 3 of the body portion 1 extends through a slot 27 formed in the front wall 8 communicating with the axial slot 18 so that the head or loop 24 of the attaching device is positioned outside of the body portion 1 for attachment of a conventional swivel 28 to which one end of a fishing line 29 is fastened. At the tail end 4 of body portion 1, the juxtaposed legs 25, 25 of the attaching device extend similarly through a slot 30 formed in the rear wall 7 so as to dispose the enlarged head or loop 24 outwardly of the body portion 1 for attachment of a fish hook 31.

A weight 32 is preferably fitted inside the body portion 1 adjacent the head 3 and is held against movement along the body by the cross piece 13 at the head end and by a cross piece 33 inserted at the rear end of the weight. The weight may of course be of any desired size depending upon the type of fishing and the fishing conditions encountered.

The closure plate 2 is thin and flat and is of substantially the same configuration as the body portion 1. The plate seats on the inner surfaces of the wings or fins 11, 11 and on the outer surfaces of the cross pieces and L-shaped members so that it is flush with the outer surfaces of the side, front and rear walls of the body portion 1 as shown in Figs. 6 and 7. Short studs 34 are formed on both extreme ends of the plate for insertion in the slots in the front and rear walls of the body portion in order to guide the plate to proper position and also to interlock the plate in position. The plate may be secured in position by suitable adhesive.

The lure body may of course be of any desired size and of any desired color.

When the lure is drawn through the water, the water striking the shoulders 12, 12 on the wings 11, 11 causes the lure to flutter and dart from side to side, throwing the spoon bait off of its course and creating a disturbance similar to that created by a wounded fish as it pursues its erratic course. This action continues with an irregular motion of the lure while it weaves from one side to the other of the line of pull of the fish line due to the shape of the wings and the two identical shoulders 12, 12. By many experiments I have found that the lure will not spin because of the wings or fins and the bent shape of the tail end. However, the shape of the lure is such that it may be pulled through the water at all speeds, either bottom side up or bottom side down as shown in full and dotted lines, respectively, in Figure 3.

While I have illustrated and described the preferred embodiment of my invention, it will be understood that changes might be made in details of construction without departing from the principle of the invention.

Having thus described my invention, what I claim as new and desire to secure by United States Letters Patent is:

1. A plastic fish lure comprising an elongated shallow channel-shaped body having one end rounded resembling the head of a small bait fish and having its other end shaped to resemble the tail end of a small bait fish, wings extending from the sides of the body, spaced cross-pieces and L-shaped pieces in both ends of the body providing communicating and intersecting slots, attaching devices for attaching a fishing line and a fish hook removably mounted in the slots in the head end and in the tail end, respectively, of the body, and a closure plate seated on the inner surfaces of the wings and on the outer surfaces of the cross-pieces and L-shaped pieces for closing the open side of the body and retaining the attaching devices in position against displacement.

2. A plastic fish lure comprising an elongated shallow channel-shaped body having one end rounded resembling the head of a small bait fish and having its other end shaped to resemble the tail end of a small bait fish, wings extending from the sides of the body, spaced cross-pieces and L-shaped pieces in both ends of the body providing communicating and intersecting slots, attaching devices for attaching a fishing line and a fish hook removably mounted in the slots in the head end and in the tail end, respectively, of the body, and a closure plate seated on the inner surfaces of the wings and on the outer surfaces of the cross-pieces and L-shaped pieces for closing the open side of the body and retaining the attaching devices in position against displacement, said attaching devices each including a piece of wire bent upon itself to form a loop at one end, juxtaposed legs and prongs bent at right angles to said legs, the loops extending outside the body.

3. A plastic fish lure comprising an elongated shallow channel-shaped body of plastic material having one end rounded resembling the head of a small bait fish and having its other end shaped to resemble the tail end of a small bait fish, wings extending from the sides of the body, spaced cross-pieces and L-shaped pieces in both ends of the body providing communicating and intersecting slots, attaching devices for attaching a fishing line and a fish hook removably mounted in the slots in the head end and in the tail end, respectively, of the body, a closure plate seated on the inner surfaces of the wings and on the outer surfaces of the cross-pieces and L-shaped pieces for closing the open side of the body and for retaining the attaching devices in position against displacement, said attaching devices each including a piece of wire bent upon itself to form a loop at one end, juxtaposed legs and prongs bent at right angles to said legs, the loops extending outside the body, a swivel attached to the loop at the head end of the body, a fishing line attached to said swivel, and a hook attached to the loop at the tail end of the body.

4. A plastic fish lure of the spoon bait type comprising an elongated shallow channel-shaped body of plastic material having one end rounded resembling the head of a small bait fish and having its other end shaped to resemble the tail end of a small bait fish, wings extending from the sides of the body, spaced cross-pieces and L-shaped pieces in both ends of the body providing communicating and intersecting slots, attaching devices for attaching a fishing line and a fish hook removably mounted in the slots in the head end and in the tail end, respectively, of the body, a closure plate seated on the inner surface of the wings and on the outer surfaces of the cross-pieces and L-shaped pieces for closing the open side of the body and for retaining the attaching devices in position against displacement, said attaching devices each including a piece of wire bent upon itself to form a loop at one end, juxtaposed legs and prongs bent at right angles to said legs, the loops extending outside the body, a swivel attached to the loop at the head end of the body, a fishing line attached to said swivel, and a hook attached to the loop at the tail end of the body, the tail end of the body being bent at an angle to the plane of the remainder of the body whereby said body resembles a spoon.

References Cited in the file of this patent
UNITED STATES PATENTS

| | | |
|---|---|---|
| 2,215,772 | Vecchia | Sept. 24, 1940 |
| 2,298,691 | Greggains | Oct. 13, 1942 |
| 2,633,659 | Baum | Apr. 7, 1953 |
| 2,670,559 | Webb et al. | Mar. 2, 1954 |
| 2,706,867 | Ayres | Apr. 26, 1955 |
| 2,719,377 | Bennett | Oct. 4, 1955 |